United States Patent
Kurfiss et al.

(10) Patent No.: US 7,266,902 B2
(45) Date of Patent: Sep. 11, 2007

(54) METHOD AND DEVICE FOR FASTENING A SENSOR

(75) Inventors: Frank Kurfiss, Muehlacker (DE); Ulrich Seger, Magstadt (DE); Uwe Apel, Neckartailfingen (DE); Andre Skuppin, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/504,654

(22) PCT Filed: Dec. 7, 2002

(86) PCT No.: PCT/DE02/04496

§ 371 (c)(1),
(2), (4) Date: Feb. 8, 2005

(87) PCT Pub. No.: WO03/074964

PCT Pub. Date: Sep. 12, 2003

(65) Prior Publication Data

US 2005/0115095 A1    Jun. 2, 2005

(30) Foreign Application Priority Data

Mar. 5, 2002    (DE)    ................. 102 09 616

(51) Int. Cl.
*G01B 5/25* (2006.01)

(52) U.S. Cl. .......................... 33/613; 33/600

(58) Field of Classification Search .......... 33/558.01, 33/600, 613, 645
See application file for complete search history.

(56) References Cited

U.S. PATENT DOCUMENTS

| | | | |
|---|---|---|---|
| 4,505,054 A * | 3/1985 | Clark et al. | 33/357 |
| 4,536,967 A * | 8/1985 | Beitzer | 33/379 |
| 4,930,226 A | 6/1990 | Shindelar | |
| 4,967,481 A * | 11/1990 | Zwicker | 33/559 |
| 5,203,091 A * | 4/1993 | Al-Farsy | 33/558.01 |
| 5,246,519 A * | 9/1993 | McCormick | 33/613 |
| 5,894,676 A * | 4/1999 | DiGiovanni | 33/645 |
| 5,992,028 A * | 11/1999 | Wing | 33/613 |
| 6,449,858 B1* | 9/2002 | Reay et al. | 33/366.12 |
| 6,672,744 B2* | 1/2004 | DeLine et al. | 362/494 |
| 6,798,955 B2* | 9/2004 | Kunkel et al. | 33/645 |
| 6,818,824 B1* | 11/2004 | Marcou et al. | 33/645 |
| 6,912,796 B2* | 7/2005 | Erdloff | 33/645 |
| 2002/0181881 A1* | 12/2002 | Kunkel et al. | 385/52 |
| 2006/0177098 A1* | 8/2006 | Stam | 382/104 |

FOREIGN PATENT DOCUMENTS

| | | |
|---|---|---|
| DE | 1983881 | 4/1968 |
| DE | 199 02 922 | 8/2000 |
| DE | 100 10 434 | 9/2001 |
| WO | WO 03/074333 | 9/2003 |

* cited by examiner

*Primary Examiner*—G. Bradley Bennett
(74) *Attorney, Agent, or Firm*—Kenyon & Kenyon LLP

(57) ABSTRACT

A method and device for securing a sensor, a stereo camera in motor vehicles in particular, in which accurate alignment of the sensor holding element is achieved during assembly using an adjusting gauge having the dimensions of the sensor and optionally pins which are inserted into matching receiving parts of the sensor holding element.

19 Claims, 3 Drawing Sheets

METHOD AND DEVICE FOR FASTENING A SENSOR

FIELD OF THE INVENTION

The present invention relates to a method for securing a sensor, in particular to a window pane of a motor vehicle.

BACKGROUND INFORMATION

For many sensors, in particular in the automobile industry, the exact alignment of the sensor during installation is decisive, because the performance of the sensor system and the measuring accuracy of the sensor depend on the precision of the installation. This is also true for image sensor systems in the motor vehicle, in particular for stereo camera systems, the image sequences of which provide information about the surroundings of the vehicle, in particular the distance to preceding vehicles or other objects when the relative positions of the individual image sensors are known. The measuring accuracy of such sensor systems greatly depends on the installed sensors maintaining their specified alignments. As a rule, holding elements having sufficient mechanical stiffness for ensuring the specified alignment are provided for the sensor or sensors. Holding devices, installed on the windshield of the vehicle, preferably using adhesives, are provided in connection with image sensing systems. These holding devices are designed in such a way that they are also used as an optical screen against the incidence of scattered light. In one embodiment, the shape of these holding elements is that of an obliquely sectioned cone, i.e., funnel. These holding elements are mounted on the windshield of the vehicle prior to windshield installation, and the camera is inserted into the holding element after the windshield is installed. Therefore, the correct alignment of the holding element with respect to the vehicle is essential for the accuracy of the sensor measurement.

SUMMARY OF THE INVENTION

The installation method according to the present invention has the advantage that the use of an adjustment aid in the installation of the holding element for the sensor aligns the holding element accurately and reproducibly, the desired accurate alignment of the sensor being ensured during subsequent installation of the sensor.

Accurate lateral positioning of motor vehicle image sensor systems with respect to the windshield is advantageously achieved, so that a lateral offset of the camera viewing field and thus partial shading of the camera viewing field are prevented. This ensures that the optical axes of the image sensor modules are aligned while both camera viewing fields are optimally covered for the intended application (e.g., object distance sensing).

The method for mounting the holding element on the windshield of a motor vehicle is particularly advantageous when the windshield has relatively large curvature variations in the relevant area. As a result, the holding element and thus indirectly the sensor itself may be attached to the windshield using thick-layer adhesive technology, broad ranges of curvature variation being tolerable. Hermetic sealing and secure adhesion of the adhesion point are also ensured.

An adjusting gauge whose dimensions correspond to those of the sensor and which cooperates with the holding element when the latter is installed is advantageously used as an adjustment aid. The desired alignment is thus achieved when installing the holding element. The adjusting gauge is provided with pressing pins, which cooperate with matching marks on the holding element and ensure accurate alignment.

A pressing plate is advantageously provided, which exerts pressing forces on the entire contact surface of the holding element and its base (windshield) via pressing pins, the pressing pins cooperating with the matching marks of the holding element. This results in optimum force distribution and a more reliable adhesion process.

It is furthermore advantageous that pressing forces are also transferable via the adjusting gauge.

In a further variant, the holding element has a two-part design, a thin connecting plate being adhered to the windshield in a first step, and the actual scattered light screen including the receiving part for the image sensor modules being attached in a second work step. This has the advantage that the connecting plates may be mounted onto the windshield at the windshield manufacturer without increasing the transport volume of the delivery to the automobile manufacturer. The scattered light screen is advantageously mounted onto the connecting plate by the automobile manufacturer via a snap-in connection, for example. The adjusting gauge is then adapted as needed.

DETAILED DESCRIPTION

Figure 1:
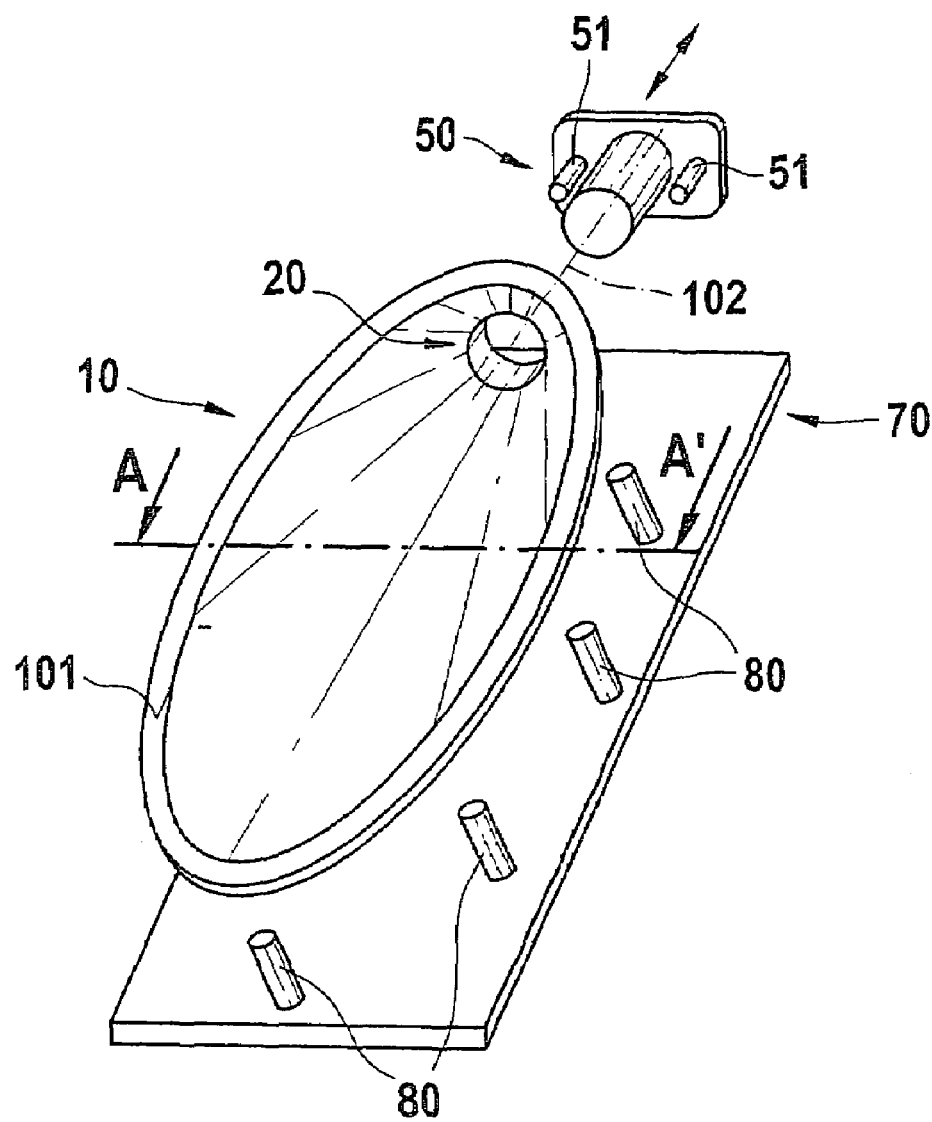
FIG. 1 shows a holding element for a sensor, in particular an image sensor system, including adjustment aid and pressing plate.

FIG. 1 shows a sensor holding element 10 (for use as a holding device for an image sensor system in motor vehicles, which is bonded to the windshield of the vehicle and is known as a windshield plate adapter) having a contact surface 101, via which holding element 10 is bonded to a base (windshield). Holding element 10 has a receiving part 20 for the sensor, which is schematically shown in FIG. 1. The figure also shows a pressing plate 70 having centering pins 80, which are arranged according to the geometry of contact surface 101 of holding element 10. These centering pins enter into an operative connection with the holding element when pressing plate 70 is pressed on and are distributed in such a way that pressing forces are transferred to entire contact surface 101, preferably an essentially uniform pressing force over the contact surface. Contact surface 101 has receiving parts which cooperate with pins 80.

Also shown is an adjusting gauge 50, the dimensions of which correspond to those of the sensor module and which is movable along axis 102 (the optical axis in the case of an image sensor system). Adjusting gauge 50 has pins 51, which are used for adjusting the holding element and, in one embodiment, for transferring forces. These pins cooperate with matching receiving parts in the holding element when the holding element is mounted on its base. In the preferred application, they are situated to the left and right next to the sensor reproduction (projection) in a preferably horizontal plane including axis 102.

The mechanical interface of the sensor module's mounting positions is used to adjust the holding element when it is adhered to its base. An appropriately designed adjusting gauge allows the holding element, i.e., its elements, to be positioned prior to the adhesion process and aligned with respect to the windshield and to one another. This is achieved as a result of the dimensions of the adjusting gauge corresponding to those of the sensor module. By positioning the adjusting gauge in the sensor receiving part of the holding element, the holding element is aligned with respect to the windshield and the adjusting gauge is aligned with respect to the holding element. The pins of the adjusting gauge cooperate with the receiving parts in the holding element. The pressing forces required for adhesion (joining forces between holding element and windshield) are achieved in one embodiment via the receiving devices of the sensor module and the pins. However, since axis 102 intersects the base (windshield) at a very flat angle in some applications, the pressing forces in these embodiments are adequate but not optimum. Therefore, in one embodiment, the adjusting gauge is extended using additional pressing pins, which transfer the forces necessary for adhesion directly to the holding element. These pressing pins are mounted on a holding plate which is aligned parallel to the windshield during the adhesion process by the manufacturing equipment. The pins are situated on a line which corresponds to the contour of the holding element, the scattered light funnel in the preferred exemplary embodiment, so that the pressing force is evenly distributed during the adhesion process. The pins are configured on the contact surface so that they center the holding element, the holding element being provided with depressions of a complementary shape for this purpose. Such a centering effect is achieved by a conical or dome shaped design of the tip of the pressing pins or by an inverse contour. The centering effect of the individual pins supports the alignment of the holding element during the adhesion process, preferably including hardening.

As an advantageous refinement, movable brackets are provided on the holding plate of the pins, these brackets enclosing the edge of the holding element during the adhesion process and ensuring direct contact of the particular centering pin with the holding element. This prevents the holding element from tipping or bending during the adhesion process, which would impair accurate alignment of the axes.

A further refinement involves a two-part design of the holding element. In a first step, only a thin connecting plate is glued onto the windshield, while the actual scattered light screen which receives the camera modules is attached in a second work step. The adjustment gauge for adhering the connecting plates is adapted as needed.

Figure 2:
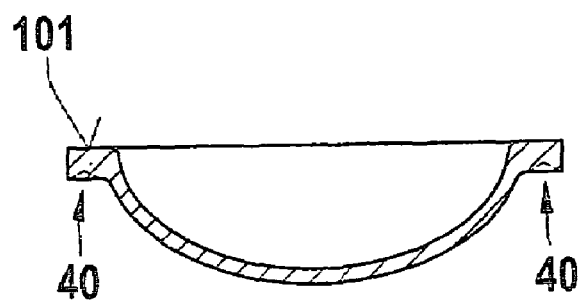
FIGS. 2 through 6 show various sections of the holding element.

FIG. 2 shows a section of the holding element along line A-A'. Contact surface 110 and, as an example, depressions 40, which enter into an operative connection with the pressing pins to provide the above-mentioned centering effect, are shown.

Figure 3:
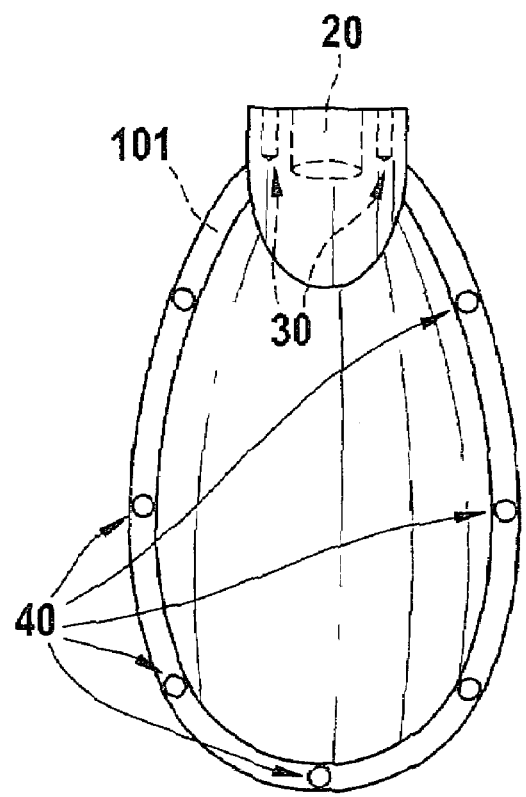

FIG. 3 shows a top view of a holding element, contact surface 101, surfaces for receiving centering pins 40, a receiving part 20 for the sensor module, and receiving parts 30 for pins 51 of adjusting gauge 50 being shown.

Figure 4:
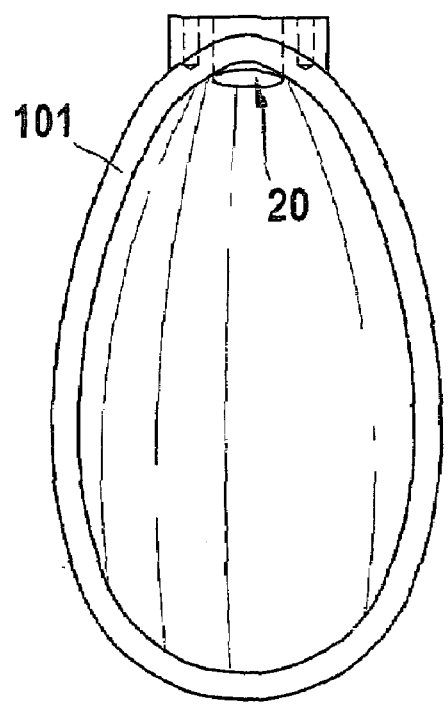

FIG. 4 shows holding element 100 viewed from below, i.e., from the base, the contact surface and sensor receiving part 20 being shown specifically.

Figure 5:
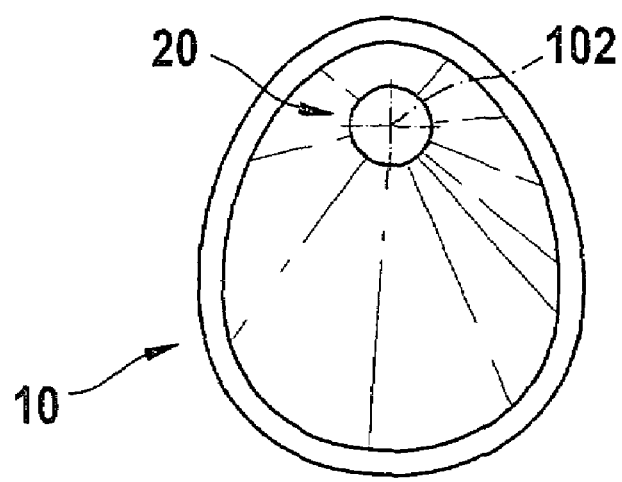
Figure 6:
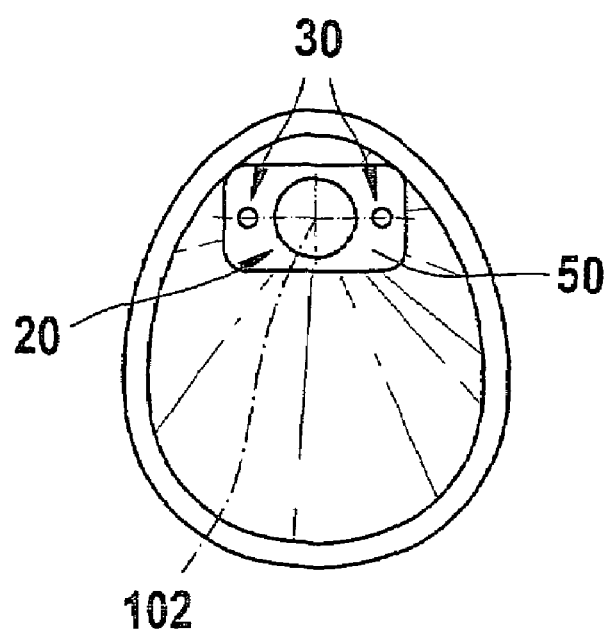

FIGS. 5 and 6 show the holding element along axis 102 from both directions. FIG. 5 shows sensor receiving part 20, while FIG. 6 shows the sensor receiving part and receiving parts for pins 51 of adjusting gauge 50.

The preferred application is a holding element for a stereo camera system in motor vehicles, which is mounted on the windshield of the vehicle. The above-described procedures and elements having the corresponding advantages are also used for other sensor modules which are similarly mounted on bases observing accurate alignment.

What is claimed is:

1. A method for securing a sensor comprising:
   guiding an adjusting gauge, having the dimensions of the sensor and being movable along a predefined axis, into a sensor receiving part of a holding element;
   aligning the holding element relative to a base by positioning the adjusting gauge in the sensor receiving part of the holding element;
   permanently bonding the holding element having the sensor receiving part to the base; and
   removing the adjusting gauge.

2. The method according to claim 1, wherein the method is for securing the sensor in a motor vehicle.

3. The method according to claim 1, wherein the holding element is adhered to the base.

4. The method according to claim 1, wherein the adjusting gauge includes a pressing plate which enters into an operative connection with the holding element during the bonding process and transfers forces to a contact surface between the holding element and the base.

5. The method of claim 4, wherein the pressing plate transfers the forces along a first axis, the method further comprising:
   transferring a pressing force by the adjusting gauge along a second axis, wherein the first and second axes are angled relative to each other.

6. The method of claim 4, wherein the pressing plate transfers the forces along a first axis which is substantially perpendicular to a portion of the contact surface between the holding element and the base.

7. The method of claim 4, further comprising:
   positioning a plurality of pins on the pressing plate such that the pressing forces are substantially evenly distributed about the contact surface between the holding element and the base.

8. The method of claim 7, further comprising:
   positioning a plurality of depressions on the holding element, the plurality of depressions being capable of receiving the plurality of pins; and
   mating the pins to the depressions to at least partially position the holding element relative to the base.

9. The method of claim 8, further comprising:
   providing each of the pressing pins with a tip contour and each of the depressions with a depression contour, wherein the depression contour is the inverse of the tip contour.

10. The method of claim 9, wherein the tip contour comprises at least one of: a conical tip contour, or a dome-shaped tip contour.

11. The method of claim 8, further comprising:
    providing a plurality of movable brackets on the pressing plate;
    enclosing the edge of the holding element by the brackets during the bonding of the holding element to the base, wherein the enclosing of the edge by the brackets ensures direct contact of the pressing pins to the receiving depressions during the bonding and prevents the holding element from tipping or bending during the bonding.

12. A device for securing a sensor comprising:
    a pressing plate having pins adapted to enter into an operative connection with matching receiving parts of a holding element for the sensor for the purpose of centering and applying a pressing force.

13. A method for securing an image sensor system comprising:
   permanently bonding a scattered light screen as a holding element having a receiving part for the image sensor system to a windshield of a vehicle, the bonding including:
   in a first step, permanently bonding a connecting element to the windshield;
and
   in a further step, connecting the scattered light screen to the connecting element.

14. The method of claim 13, wherein the connecting comprises connecting the scattered light screen to the connecting element via a snap-in connection.

15. The method of claim 13, wherein the permanently bonding comprises gluing the connecting element to the windshield.

16. A device for securing a sensor comprising:
   a receiving part for the sensor; and
   pin receiving parts adapted to receive pins in a process of bonding the device to a base.

17. The device according to claim 16, wherein the receiving parts are situated at least one of (a) in an area of the sensor receiving part and (b) on a side of a contact surface between the device and the base, the side facing away from the base.

18. The device according to claim 16, wherein the sensor is an image sensor system for motor vehicles.

19. The device according to claim 16, wherein the sensor is a stereo camera system.

* * * * *